June 10, 1958      B. FEENEY      2,838,086
MOTOR VEHICLE TRACTION ATTACHMENT
Filed Oct. 29, 1956      2 Sheets-Sheet 1
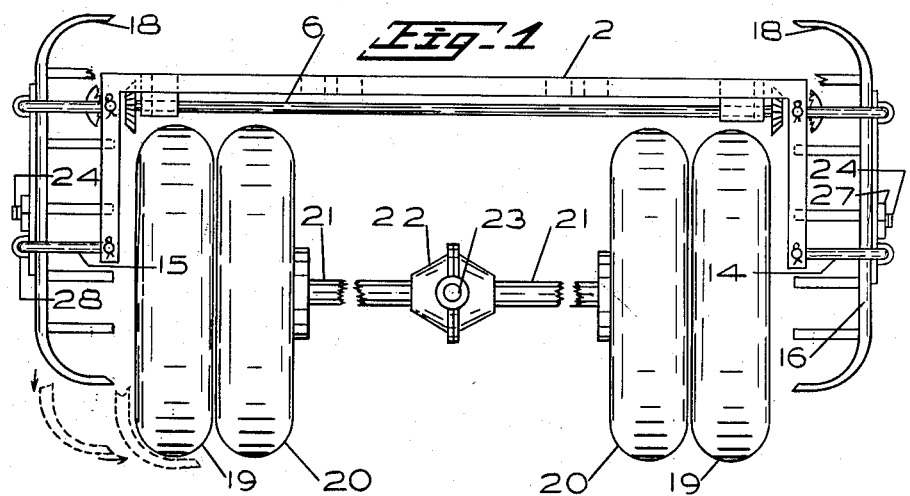
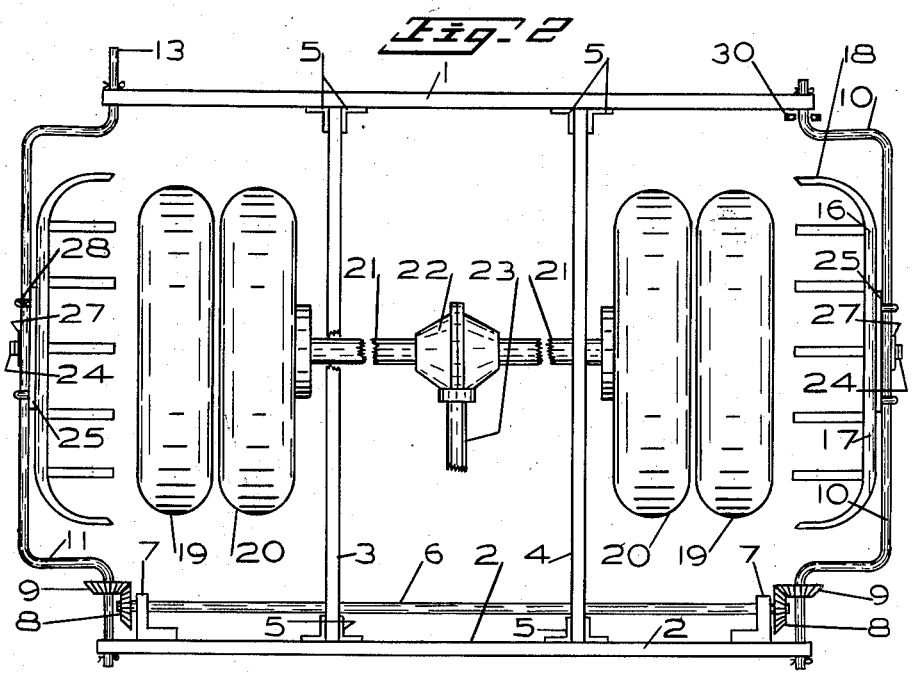
Inventor
Bernard Feeney
per L. S. Mitchell
Attorney June 10, 1958　　　　　B. FEENEY　　　　　2,838,086
MOTOR VEHICLE TRACTION ATTACHMENT
Filed Oct. 29, 1956　　　　　　　　　　　　2 Sheets-Sheet 2
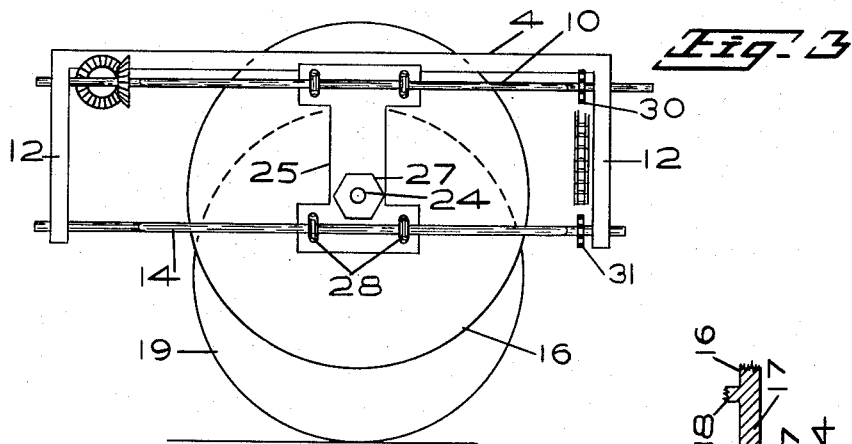
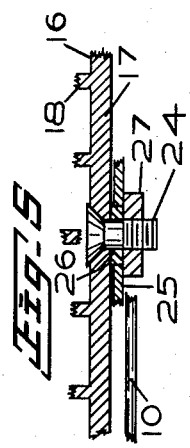
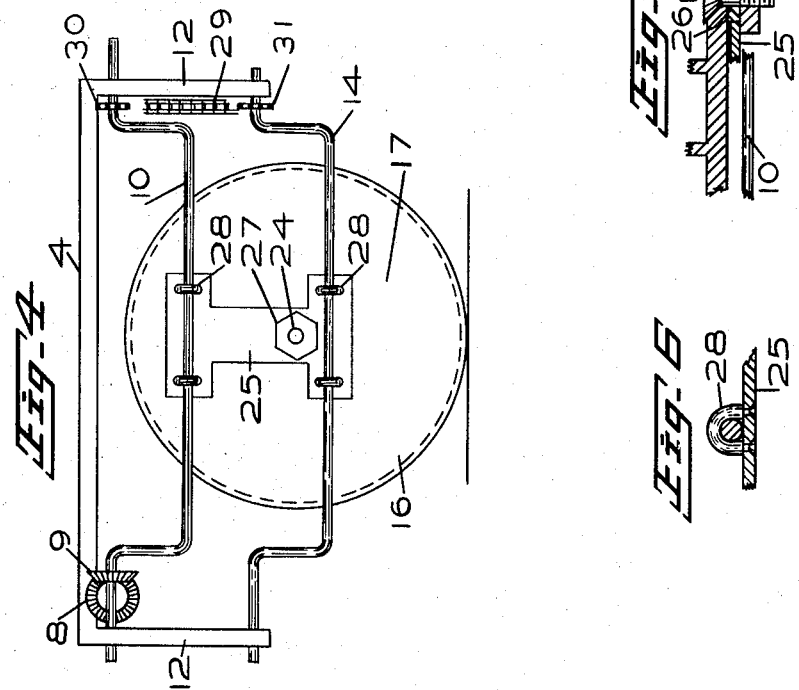
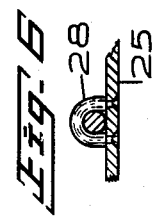
Inventor
Bernard Feeney
Per L. A. Mitchell
Attorney 2,838,086

MOTOR VEHICLE TRACTION ATTACHMENT

Bernard Feeney, Salmo, British Columbia, Canada

Application October 29, 1956, Serial No. 618,870

2 Claims. (Cl. 152—214)

My invention relates to traction attachments for motor vehicle wheels, having reference to auxiliary traction elements to be carried by the vehicle and adapted for shifting in and out of engagement with the vehicle wheels.

In a patent granted to me in Canada in 1941 under Number 394,498 I disclosed a frame or hanger for suspension in the vehicle, with auxiliary traction wheels carried by the frame and crank means for lowering and raising the auxiliary wheels in and out of working relation with the vehicle wheels and the ground.

The present invention contemplates improvements in this device by provision of wheel engaging traction elements carried in the frame movable to be clamped on the vehicle traction wheels when required. The device further provides improved mountings for the elements.

Other features and advantages of the invention will become apparent by reference to the accompanying description taken in conjunction with the drawings, wherein like characters of reference indicate like parts throughout the several views and wherein:

Fig. 1 is a rear end view of a hanger for suspension on a motor vehicle and including my improved traction elements carried thereby, the latter being shown disengaged from the wheels and elevated into position for travel as when not in use, the whole being mounted in relation to a vehicle traction wheel assembly and the latter being shown partly broken away.

Fig. 2 is a plan view of same.

Fig. 3 is an end view of the attachment including a vehicle wheel, shown with the auxiliary traction element raised out of engagement with the wheel.

Fig. 4 is a view similar to that of Fig. 3, but with the auxiliary traction element lowered into position for engagement of the wheel.

Fig. 5 shows a detail fragmentary top view of a traction element and mounting therefor, shown partly in section and broken away in part.

Fig. 6 shows a fragment in section of a traction element supporting bracket with U clamp attaching a crank shaft thereto, the latter being shown in cross section.

Having reference to the drawings there is provided a frame for suspension in the motor vehicle consisting of side bars 1 and 2 with intermediate connecting cross bars 3 and 4 secured by brackets 5.

The side bar 2 carries a shaft 6 rotatable in angle bearing brackets 7, the shaft including bevel pinions 8 at the ends engaging bevel pinions 9 on primary crank shafts 10 and 11, all this being in accordance with the disclosure in my previously granted patent. In the present showing these primary crank shafts are mounted for rotation in suitable bearing openings in brackets 12 depending from the ends of the side bars 1 and 2. The crank shaft 10 provides an extension 13 adapted for engagement by hydraulic means in the vehicle for operation of the crank shafts. Further rotatable in the depending brackets 12 are secondary crank shafts 14 and 15. These secondary crank shafts are connected by a chain 29 trained over pinions 30 and 31 on the primary and secondary crank shafts respectively and by which the two crank shafts are caused to work in unison.

On the crank shafts 10 and 11, and the secondary crank shafts 14 and 15, are carried traction elements 16 providing flat body portions 17 and a series of inwardly directed integral ground engaging treads 18 adapted for clamping engagement over the wheels 19 of the motor vehicle, the parts of the treads engaging the traction wheels conforming to the contour of that portion of the wheels on which they engage. In the present showing dual wheels 19 and 20 are indicated, it being understood the traction attachment could be used on either single or double assemblies on automobiles or trucks, engaging only the outside wheels. The wheels 19 and 20 are shown mounted on axle shafts 21 of the motor vehicle connected by a differential at 22 with drive shaft 23.

The traction elements 16 are mounted for rotation on stub axle shafts 24 carried in brackets 25, said axle shafts including shoulders at 26 against which the traction elements bear and nuts 27 threaded on the ends.

The crank shafts 10, 11, 14 and 15 are attached to the brackets 25 free to turn in U clamps 28.

In the use of the device the frame formed by the side bars 1 and 2 and the cross bars 3 and 4 is designed to be suspended in the vehicle with the traction elements carried thereby and normally elevated out of working relation with the wheels and ground. By turning the crank shaft 11 the two traction elements 16 may be raised or lowered.

The connection of the crank shaft 11 for raising or lowering the traction elements is through shaft 6 and bevel pinions 8 and 9, which serves to operate the crank shaft 10 simultaneously. Continued turning of crank shaft 11 after the traction elements are lowered brings them into clamping engagement with the wheels, as more clearly indicated in Fig. 1.

Correspondingly a reverse turning of crank shaft 11 disengages the traction elements from the wheels and raises them into inoperative position for travel.

While I have herein disclosed a preferred embodiment of my improvements it is to be understood that changes in the construction and arrangement of parts would be readily conceivable, but in so far as such changes come within the spirit and scope of the invention as defined in the appended claims they would be considered a part hereof.

Having thus particularly described and ascertained the nature of my said invention, what I claim and wish to secure by Letters Patent is:

1. In a traction attachment for motor vehicles of a character providing a frame for suspension in the vehicle in working relation to traction wheels therein, said attachment including primary crank shafts and a shaft in the frame connected for rotation of said crank shafts the one by the other, secondary crank shafts, depending brackets in the frame in which the primary and secondary crank shafts are mounted to rotate, means connecting the secondary crank shafts to be driven by the primary crank shafts, brackets to which the primary and secondary crank shafts attach free to turn thereon, stub axle shafts carried by said brackets, and a wheel engaging traction element mounted for rotation on each of said stub axle shafts.

2. A device as defined in claim 1 in which the traction elements comprise circular bodies with inwardly directed integral treads, said treads being adapted for clamping engagement over traction wheels of the vehicle and said treads conforming on their engaging faces to the contour of that portion of the vehicle wheels over which they engage.

References Cited in the file of this patent

UNITED STATES PATENTS

| | | |
|---|---|---|
| 2,598,851 | Spevak | June 3, 1952 |
| 2,730,156 | Ansel | Jan. 10, 1956 |